(12) United States Patent
Hahn et al.

(10) Patent No.: US 7,422,788 B2
(45) Date of Patent: Sep. 9, 2008

(54) DOUBLE-SIDED ADHESIVE TAPE AND METHOD FOR FIXING A SEALING ELEMENT IN PLACE

(75) Inventors: Roland Hahn, Germering (DE); Harald Roedel, Rehau (DE)

(73) Assignee: Webasto AG and Rehau AG & Co., Stockdorf (DE)

( * ) Notice: Subject to any disclaimer, the term of this patent is extended or adjusted under 35 U.S.C. 154(b) by 136 days.

(21) Appl. No.: 10/204,545

(22) PCT Filed: Dec. 13, 2001

(86) PCT No.: PCT/EP01/14673

§ 371 (c)(1),
(2), (4) Date: Dec. 16, 2002

(87) PCT Pub. No.: WO02/49866

PCT Pub. Date: Jun. 27, 2002

(65) Prior Publication Data

US 2003/0151212 A1     Aug. 14, 2003

(30) Foreign Application Priority Data

Dec. 21, 2000     (DE)     ............... 100 64 386

(51) Int. Cl.
*E06B 7/22*     (2006.01)
*E06B 7/23*     (2006.01)
*B32B 3/00*     (2006.01)
*B32B 3/26*     (2006.01)
*B32B 7/04*     (2006.01)
*B32B 9/04*     (2006.01)
*F16J 15/00*    (2006.01)

(52) U.S. Cl. ............... 428/313.3; 428/353; 428/354; 428/446; 428/447; 428/448; 49/498.1; 277/645; 277/644

(58) Field of Classification Search ............... 428/40.1, 428/54–56, 71, 195.1, 198, 221, 304.4, 313.3, 428/313.5, 313.9, 315.9, 317.1, 317.5, 353, 428/354; 277/628, 644, 645, 647, 943; 49/498.1
See application file for complete search history.

(56) References Cited

U.S. PATENT DOCUMENTS 4,591,622 A * 5/1986 Blizzard et al. ............. 525/477

(Continued)

FOREIGN PATENT DOCUMENTS

CA     2310758 A1 *     6/1999

(Continued)

OTHER PUBLICATIONS

English abstract of JP 05-25441.*
English Machine Translation of JP 05-25441.*

*Primary Examiner*—Philip C Tucker
*Assistant Examiner*—Sing P Chan
(74) *Attorney, Agent, or Firm*—David S. Safran

(57) ABSTRACT

A double-sided adhesive tape (24) and a method for fixing a sealing element (10) in place, preferably in motor vehicles, has a sealing body (12) made from silicone, to which a first self-adhesive sticking surface (18) of a double-sided adhesive tape (24) is applied which is formed at least partly of a silicone glue. The double-sided adhesive tape (24) is provided with a second self-adhesive sticking surface (20) for fixing to the site of application.

13 Claims, 2 Drawing Sheets

U.S. PATENT DOCUMENTS

| | | | | |
|---|---|---|---|---|
| 4,839,206 A | * | 6/1989 | Waldenberger | 428/41.5 |
| 5,589,246 A | * | 12/1996 | Calhoun et al. | 428/120 |
| 6,233,872 B1 | | 5/2001 | Glagow et al. | |
| 6,344,260 B1 | * | 2/2002 | Lythgoe et al. | 428/195.1 |
| 6,367,865 B1 | * | 4/2002 | Royse | 296/146.9 |
| 6,485,030 B1 | * | 11/2002 | Hahn et al. | 277/645 |
| 6,521,309 B1 | * | 2/2003 | Chen et al. | 428/40.1 |

FOREIGN PATENT DOCUMENTS

| | | |
|---|---|---|
| DE | G 94 17 149.1 U1 | 2/1995 |
| DE | 199 16 985 A | 10/2000 |
| EP | 0 357 973 A1 | 3/1990 |
| EP | 357973 A1 * | 3/1990 |
| EP | 1 095 808 A | 5/2001 |
| JP | 05025441 A * | 2/1993 |
| WO | WO 99 26801 A | 6/1999 |

* cited by examiner

DOUBLE-SIDED ADHESIVE TAPE AND METHOD FOR FIXING A SEALING ELEMENT IN PLACE

BACKGROUND OF THE INVENTION

1. Field of the Invention

This invention relates to a double-sided adhesive tape and a process for attaching a sealing element which comprises a sealing body, made of silicone, to an application site using silicon cement.

2. Description of Related Art

In the motor vehicle domain, there are silicone seals which are provided with an insertion foot, by means of which they can be inserted at the application site. This type of attachment however entails high production demand and high demand for installation space and is disadvantageous in this respect.

Furthermore, commonly-owned, co-pending U.S. patent application Ser. No. 09/698,139 discloses a silicone seal which can be attached by means of a liquid silicone cement to an adhesive tape which acts on one side; its outer adhesive surface which is initially covered by a protective film is used for attachment at an application site after the protective film is removed. The several hours of setting time of the liquid silicone cement makes process-reliable use difficult in mass production designed for rapid throughput. Another disadvantage of this silicone seal is that, by using liquid silicone cement, a soft-elastic connection between the carrier element and the sealing body of the sealing element takes place, since liquid silicone cements, as a permanently sticky cement, leads to a reversible adhesive connection which, under certain stress conditions, leads to an adverse effect on sealing action, for example, when used in sliding motor vehicle roofs.

Due to the soft-elastic connection, displacement as far as detachment of the sealing body can take place so that undisturbed operation of a sliding motor vehicle roof is not guaranteed.

German Utility Model DE-G 94 17 149 discloses a sealing element with a sealing body of elastic material which has an adhesive surface, by means of which it is attached to the bottom of the cover of a sliding roof, lifting roof, etc. The adhesive surface is made on an adhesive tape which is attached with its back to a base body which is connected to the sealing body and is made of a stiffer material than the sealing body. Before attachment of the seal, the adhesive surface is protected with a removable protective film.

Other sealing elements are known from German Patent DE 197 20 713 C1 and published European Patent Application EP 0 357 973 B1, the preferred material for the sealing body being ethylene-propylene rubber (EPDM). However, this material is not optimally suited with respect to its temperature resistance, restoration behavior, sealing properties, and danger of freezing-on and conglutination.

SUMMARY OF THE INVENTION

The object of this invention is to devise a double-sided adhesive tape and a process for producing and for attaching a sealing element with the sealing body to an application site, made of silicone, by means of which economical production of a quick and simplified, as well as process-reliable, adhesive connection at the application site is enabled.

This object is achieved in accordance with the invention with respect to the double-sided adhesive tape, by the scaling element being made of a silicone material and the adhesive surface facing the sealing element being formed at least partially by a silicone cement, with respect to the process for attachment, by the double-sided adhesive tape sealing element being attached to the sealing element with a silicone cement on one side of the tape, and then, after removing a protective tape for the other side of the adhesive tape, is attached to the application site, and with respect to the process for production, by the process steps of, extruding the sealing body, producing a carrier element from acrylate foam with a protective film on the bottom, applying a primer to the top of the carrier element, applying silicone cement which forms an adhesive surface to the primer, joining the sealing body to the adhesive surface, and cross-linking the silicone cement which forms the adhesive surface by the action of temperature and/or pressure and/or moisture.

The double-sided adhesive tape with one adhesive surface which has a silicone cement enables, for the first time, the simple, prompt and reliable possibility of attachment of such an adhesive tape to an opposing surface of silicone.

Another advantage is that the silicone cement placed between the carrier element and the sealing body enables a material and frictional connection which is formed by cross-linking and full curing of this silicone cement.

Preferably, the component areas of the first adhesive surface can be provided with a quick-setting cement, for example, an acrylate cement, which, when the first adhesive surface is applied to the opposing surface of silicone, provides first of all for tentative fixing, while the silicone cement in the other areas cross-links or fully cures to produce operating strength.

Alternatively, the first adhesive surface can also contain a mixture of silicone cement and another adhesive, such as, for example, acrylate cement.

Because in the process in accordance with the invention, for attachment of the sealing element to the sealing body, initially, a first adhesive surface of a double-sided adhesive tape, which surface has a silicone cement, is applied, the sealing element is prepared such that, after pulling off the protective film from its second self-sticking adhesive surface, with an adhesive which is preferably matched to the properties of the corresponding application site, the sealing element can be attached easily and quickly to the application site, for example, to one edge of a sliding roof cover or an opening edge which surrounds the latter.

In the approach according to the invention, it is advantageous for the sealing body of a silicone to have outstanding properties with respect to temperature resistance, restoration behavior, tightness and protection against freezing-on and conglutination and still the sealing element can be attached quickly, easily and with little demand for installation space to the application site, while, for example, with direct cementing of the sealing body to the application site by means of silicone cement as a result of the resulting long setting time, use in series production is not possible.

The invention overcomes a pre-judgment of the specialty according to which the advantages of a silicone seal cannot be combined with simple installation using a self-sticking adhesive surface which is provided on the seal. By using a cross-linking or fully curing silicone cement, it is surprisingly possible to produce a material and frictional connection between the sealing body and the double-sided adhesive tape and the application site which does not have any soft-elastic properties and likewise does not necessitate additional setting times.

In one preferred embodiment of the invention, the second adhesive surface is formed, for example, by an acrylate cement. The carrier element is especially preferably formed from an acrylate foam which contains an acrylate cement, and thus, itself, directly forms the second adhesive surface facing the application site. Furthermore, the adhesive surface is preferably made planar.

Between the first and second adhesive surface of the double-sided adhesive tape, there is a carrier element which is formed preferably by a flexible tape. The adhesive surface extends preferably essentially over the entire length of the sealing body. According to one alternative embodiment, the carrier element is formed by an acrylate foam.

Production of a sealing element according to the invention which has a sealing body made of silicone is performed by continuously producing the sealing body of silicone by an extrusion process in a first process step, and by at least partially coating the double-side adhesive tape with a silicone cement in a second process step.

In a third process step, the sealing body and the double-sided adhesive tape are joined to one another via the silicone cement which forms the first adhesive surface, and in a fourth process step, the silicone cement which forms the adhesive surface is cross-linked by the action of temperature and/or pressure and/or moisture.

This process in accordance with the invention makes it possible to control, by monitoring, the time of cross-linking or full curing of the silicone cement which forms the adhesive surface via the parameters of temperature and pressure, so that the sealing element according to the invention, in the attachment to the application site, always has material and frictional engagement between the sealing body and the double-sided adhesive tape.

Another process for producing the sealing element in accordance with the invention is characterized by a first process step in which the sealing body made of silicone is continuously produced by the extrusion process, and in which in a second process step, a silicone cement is at least partially applied to the planar bottom of the sealing body.

In another process step, the double-sided adhesive tape is joined to the sealing body which has the silicone cement, and in a fourth process step, cross-linking of the silicone cement which forms the first adhesive surface is implemented by the action of temperature and pressure.

When using a carrier element of acrylate foam, between the adhesive surface of silicone cement facing the sealing element and the carrier element, a primer is applied in an intermediate step.

Furthermore, it was advantageously ascertained that, by the controlled action of moisture on the silicone cement which is to be cross-linked and which forms the first adhesive surface, another influencing parameter arises which benefits the material and frictional engagement between the sealing body and the double-sided adhesive tape.

Preferred embodiments of the invention are explained in detail below with reference to the accompanying drawings.

DETAILED DESCRIPTION OF THE INVENTION

Figure 1:
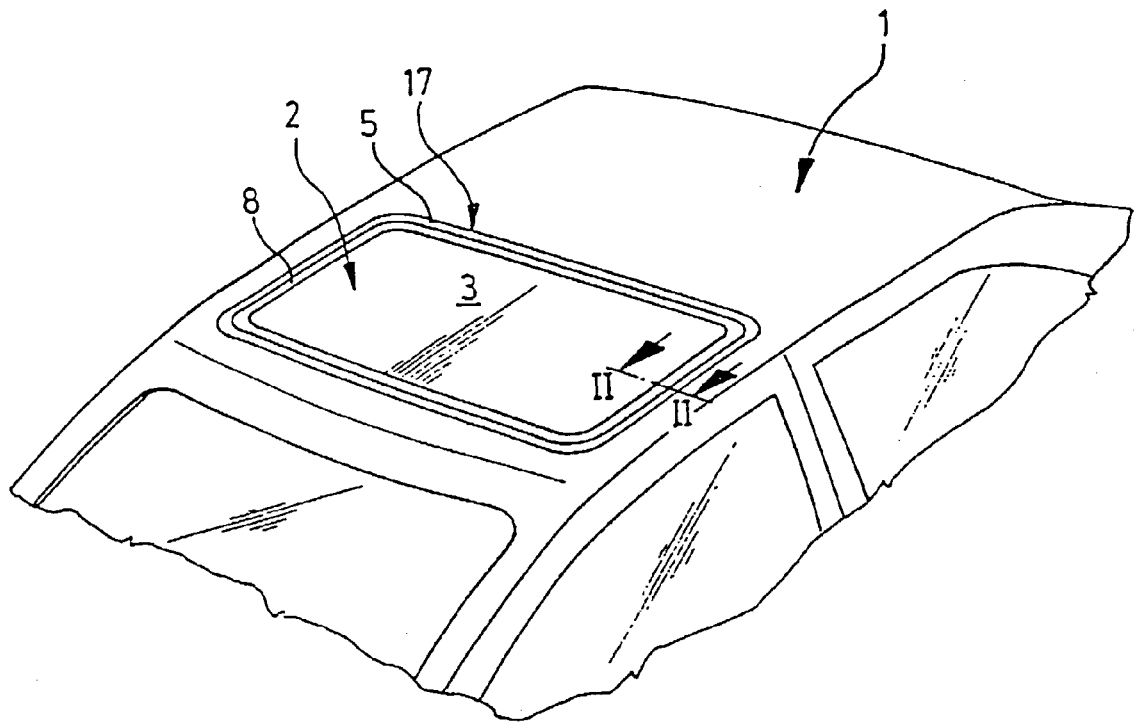
FIG. 1 shows a schematic perspective of a motor vehicle roof with an openable cover.

FIG. 1 shows an openable motor vehicle roof 1 in which a roof opening 2 can be alternately closed or at least partially exposed by means of a cover 3. For sealing an outside edge 26 of the cover 3 against the edge 17 of the roof opening 2, there is either a seal 8 on the outer side 26 of the cover 3, as shown in FIG. 2, or a seal 5 on the edge 17 of the roof opening 2.

Figure 2:
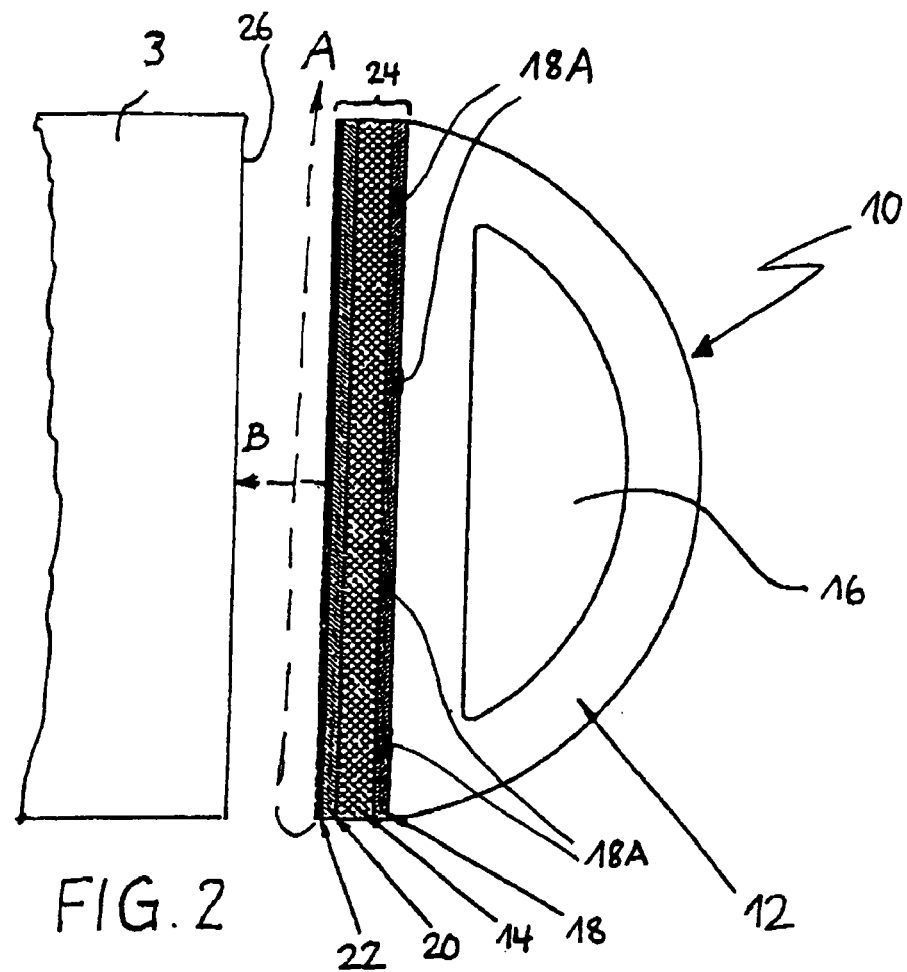
FIG. 2 shows a cross section through a sealing element which is to be attached to the cover edge.

FIG. 2 shows a sealing element 10 which can be used, for example, as a seal 5 or seal 8 shown in FIG. 1. The sealing element 10 is formed by a sealing body 12 which preferably is made of an elongated extruded profile of silicone and a hollow chamber 16 formed in this extruded profile. The sealing body 12 is made planar on its bottom over the entire length and width.

A double-sided adhesive tape 24 with a first adhesive surface 18 is attached to the sealing element 10; this surface is characterized in that it has a silicone cement which, as a result of the small layer thickness and cross-linking, forms a strong bond with the bottom of the sealing body 12.

Such a double-sided adhesive tape 24, however, is also outstandingly well suited for use at other application sites at which the positive properties of silicone take effect directly. In particular, in this connection, seals on or in buildings are also conceivable.

The double-sided adhesive tape 24 comprises a flexible carrier element 14 which is joined to the first adhesive surface 18. The carrier element 14 is cemented by material and frictional engagement by means of the adhesive surface 18 of silicone cement over the entire length and width on the bottom of the sealing body 12. On the side of the carrier element 14 facing away from the sealing body 12, the double-sided adhesive tape 24 is provided with a second self-sticking adhesive surface 20 which is used for attaching the sealing element 10 to the application site.

The adhesive surface 20 is protected before attachment of the sealing element 10 to the application site by a protective film 22 which is then removed during installation. The removal of the protective film 22 is indicated by the arrow A in FIG. 2, and the subsequent joining of the sealing element 10 via the double-sided adhesive tape 24 is indicated by the arrow B. The material of the adhesive surface 20 is chosen depending on the adhesive base at the application site, preferably an acrylate cement being used. The adhesive surface 20 extends preferably over the entire length and width of the bottom of the double-sided adhesive tape 24 and is made essentially planar.

The described sealing element 10 is used preferably to seal the cover 3 of an openable motor vehicle roof 1, such as, for example, a sliding roof, lifting roof, sliding/lifting roof, louvered roof or spoiler roof, and it can be attached, for example, as a seal 8 to the side edge 26 or also on the bottom of the cover 3 or as a seal 5 to one opening edge 17 of a roof opening 2 which can be closed by the cover 3.

Figure 3:
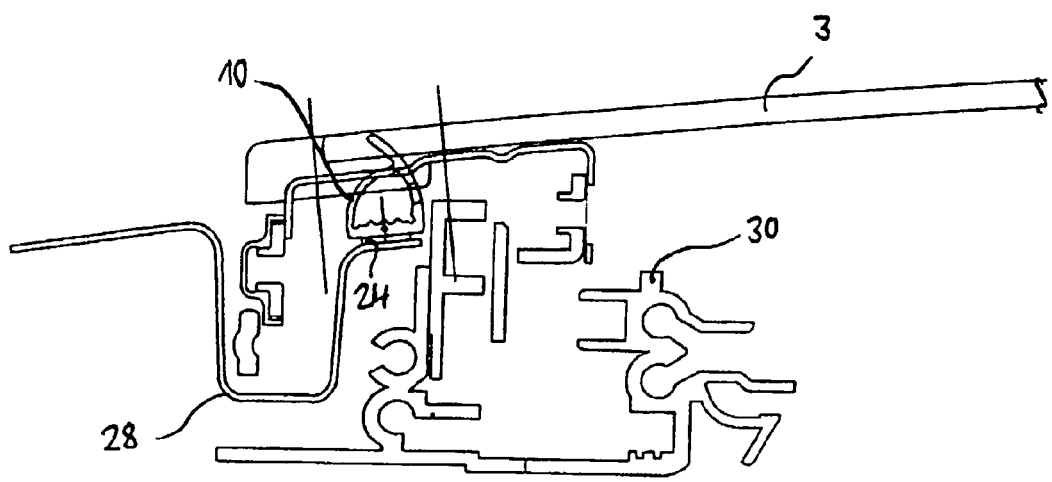
FIG. 3 shows a cross section through a sealing element which is located on the roof frame.

Finally, as shown in FIG. 3, attachment to a horizontal flange area of a roof frame 28 is also possible. In this case, the cover 3, in the closed state, adjoins the sealing element 10 from above to form a seal. The guide rail 30 is used to guide the raising and displacement mechanism of the cover 3 (not shown).

Figure 4:
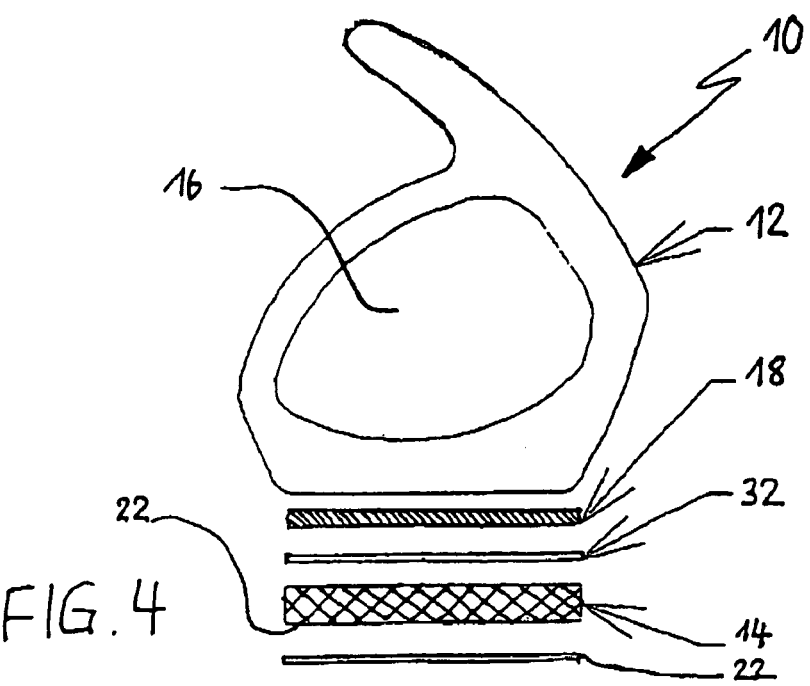
FIG. 4 shows a cross section through an alternative structure of a double-sided adhesive tape with an acrylate foam as the carrier element.

In the version shown in FIG. 4, a carrier element 14 of acrylate foam is used; it is applied to a protective film 22. The acrylate foam contains an acrylate cement so that the bottom of the carrier element 14, after detachment of the protective film, can be applied directly as an adhesive surface 22 to the application site. A primer layer 32, which is used to impart adhesion between the carrier element 14 and the adhesive surface 18 of silicone cement, is applied to the top of the carrier element 14 which is formed from acrylate foam.

For example, material E 415 from Wacker Chemie is well suited as the silicone cement for producing the adhesive surface 18. The primer for producing the primer layer 32 is, for example, material G 718 from Wacker Chemie. The material acrylic foam from 3M is very well suited as the acrylate foam with the integrated acrylate adhesive surface.

This invention devises a sealing element which has good properties with respect to temperature resistance, restoration behavior, sealing properties, freezing-on and conglutination danger and still can be attached to the application site easily and promptly, in which neither plug connections which require relatively large installation space and installation effort, nor liquid silicone cement which entails a long setting time and which leads to a soft-elastic and thus reversible adhesive connection are used.

Production of a sealing element according to the invention which has a sealing body made of silicone is performed by continuously producing the sealing body of silicone by an extrusion process in a first process step, and by at least partially coating the double-side adhesive tape with a silicone cement in a second process step. In addition, the adhesive surface 18, having the silicone cement, may also include partial areas with another cement as indicated at 18A in FIG. 2. Although shown in spaced multiple areas along surface 18, it is understood that this showing is merely a generic teaching and encompasses any pattern known in the conventional art.

In a third process step, the sealing body and the double-sided adhesive tape are joined to one another via the silicone cement which forms the first adhesive surface, and in a fourth process step, the silicone cement which forms the adhesive surface is cross-linked by the action of temperature and/or pressure and/or moisture.

This process in accordance with the invention makes it possible to control, by monitoring, the time of cross-linking or full curing of the silicone cement which forms the adhesive surface via the parameters of temperature and pressure, so that the sealing element according to the invention, in the attachment to the application site, always has material and frictional engagement between the sealing body and the double-sided adhesive tape.

Another process for producing the sealing element in accordance with the invention is characterized by a first process step in which the sealing body made of silicone is continuously produced by the extrusion process, and in which in a second process step, a silicone cement is at least partially applied to the planar bottom of the sealing body.

In another process step, the double-sided adhesive tape is joined to the sealing body which has the silicone cement, and in a fourth process step, cross-linking of the silicone cement which forms the first adhesive surface is implemented by the action of temperature and pressure.

When using a carrier element of acrylate foam, between the adhesive surface of silicone cement facing the sealing element and the carrier element, a primer is applied in an intermediate step.

Furthermore, it was advantageously ascertained that, by the controlled action of moisture on the silicone cement which is to be cross-linked and which forms the first adhesive surface, another influencing parameter arises which benefits the material and frictional engagement between the sealing body and the double-sided adhesive tape.

What is claimed is:

1. Seal arrangement for sealing an application site, comprising:
   a sealing element made of a silicone material;
   a double-sided adhesive tape for attachment to the sealing element, said tape having a carrier element located between two self-sticking adhesive surfaces, said carrier element being formed by a flexible tape including an acrylate foam;
   wherein a first of the two self-sticking adhesive surfaces which faces the sealing element is formed at least partially of a silicone cement and a second of the two self-sticking adhesive surfaces includes an acrylate cement; and
   wherein a primer is provided on said first of the adhesive surfaces that is formed at least partially of the silicone cement, said primer being provided between said first of the adhesive surfaces and the carrier element.

2. Seal arrangement as claimed in claim 1, wherein the silicone cement is a cross-linking silicone cement.

3. Seal arrangement as claimed in claim 1, wherein the adhesive surface which has the silicone cement has partial areas with another cement.

4. Seal arrangement as claimed in claim 1, wherein the second of said adhesive surfaces faces the application site.

5. Seal arrangement as claimed in claim 1, wherein the silicone cement is a cross-linking silicone cement and the other of the two self-sticking adhesive surfaces is formed of an adhesive optimally adapted for adherence to an attachment site to which the seal is applied.

6. Seal arrangement as claimed in claim 1, wherein the sealing element is an edge seal for a movable cover of an openable motor vehicle roof and the second of the two self-sticking adhesive surfaces being adapted for being affixed, in use, to a side edge of the movable cover.

7. Seal arrangement in accordance with claim 6, wherein the sealing element is an elongated extruded profile with a hollow chamber extending lengthwise within it.

8. An openable motor vehicle roof comprising:
   a movable cover disposed in an opening in a fixed vehicle roof surface; and
   a sealing arrangement for sealing said movable cover relative to said fixed vehicle roof surface,
   wherein said sealing arrangement comprises:
      a sealing element made of a silicone material;
      a double-sided adhesive tape attached to the sealing element, said tape having a carrier element formed of an acrylate foam located between two self-sticking adhesive surfaces;
   wherein a first of the two self-sticking adhesive surfaces which faces the sealing element is formed at least partially of a silicone cement and a second of the two self-sticking adhesive surfaces includes an acrylate cement; and
   wherein a primer is provided on said first of the adhesive surfaces that is formed at least partially of the silicone cement, said primer being provided between said first of the adhesive surfaces and the carrier element.

9. Openable motor vehicle roof in accordance with claim 8, wherein the sealing element is an elongated extruded profile with a hollow chamber extending lengthwise within it.

10. A sealing element for use in motor vehicles, comprising a sealing body made of silicone,
   a carrier element formed of an acrylate foam,
   first and second self-sticking adhesive surfaces, one on each side of the carrier element,
   the first adhesive surface being bonded to the sealing body and being formed at least partially of a silicone cement, and
   a protective film attached over the second self-sticking adhesive surface, said protective film being removable for attachment of the sealing body to an application site by said second self-sticking adhesive surface, and an intermediate adhesion layer between the first self-sticking adhesive surface and the carrier element, the intermediate adhesion layer being affixed to the carrier element to impart adhesion between the carrier element and the first adhesive surface which has been bonded, via the intermediate adhesion layer, to the carrier element with said silicone cement cross-linked.

11. Sealing element in accordance with claim 10, wherein the second adhesive surface is formed of an acrylate cement.

12. Sealing element in accordance with claim 10, wherein the second adhesive surface is formed directly by the acrylate foam of the carrier element.

13. Sealing element in accordance with claim 10, wherein the sealing body is an elongated extruded profile with a hollow chamber extending lengthwise within it.

* * * * *